United States Patent [19]

Nada et al.

[11] 3,920,998

[45] Nov. 18, 1975

[54] PHOSPHOR FOR THERMOLUMINESCENT RADIATION DOSIMETER

[75] Inventors: Naohiro Nada, Nishinomiya; Tadaoki Yamashita, Hirakata, both of Japan

[73] Assignee: Matsushita Electric Industrial Co., Ltd., Osaka, Japan

[22] Filed: Mar. 5, 1974

[21] Appl. No.: 449,207

Related U.S. Application Data

[62] Division of Ser. No. 138,118, April 28, 1971.

[30] Foreign Application Priority Data

May 29, 1970 Japan.............................. 45-46730

[52] U.S. Cl................................. 250/484; 250/472
[51] Int. Cl................................................ G01t 1/11
[58] Field of Search........................... 250/472, 484

[56] References Cited
UNITED STATES PATENTS 3,419,720　12/1968　Debye et al..................... 250/484 X
3,484,605　12/1969　Attix............................... 250/484 X
3,637,518　1/1972　Nada et al. ..................... 250/484 X Primary Examiner—Archie R. Borchelt
Attorney, Agent, or Firm—Stevens, Davis, Miller & Mosher

[57] ABSTRACT

Phosphor composed of primarily of BeO and more than 0.5% % and up to 10% by mole of at least one activator selected from the group consisting of lithium, sodium and potassium is prepared by mixing a raw material high purity beryllium oxide with at least one kind of the activators of lithium, sodium and potassium and sintering the resulting mixture in a covered crucible at a temperature of 1,500°C to 2,100°C for 3 to 24 hours and is used for a thermoluminescent radiation dosimeter. The material can exactly measure the radiation dose up to a high level such as 1,000 to 2,000 roentogens.

2 Claims, 2 Drawing Figures

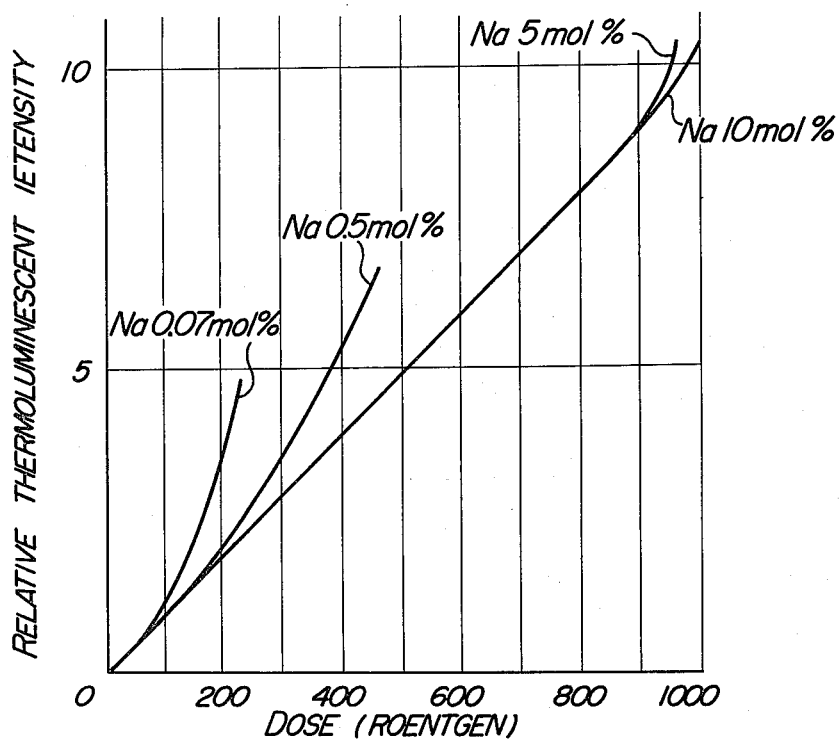
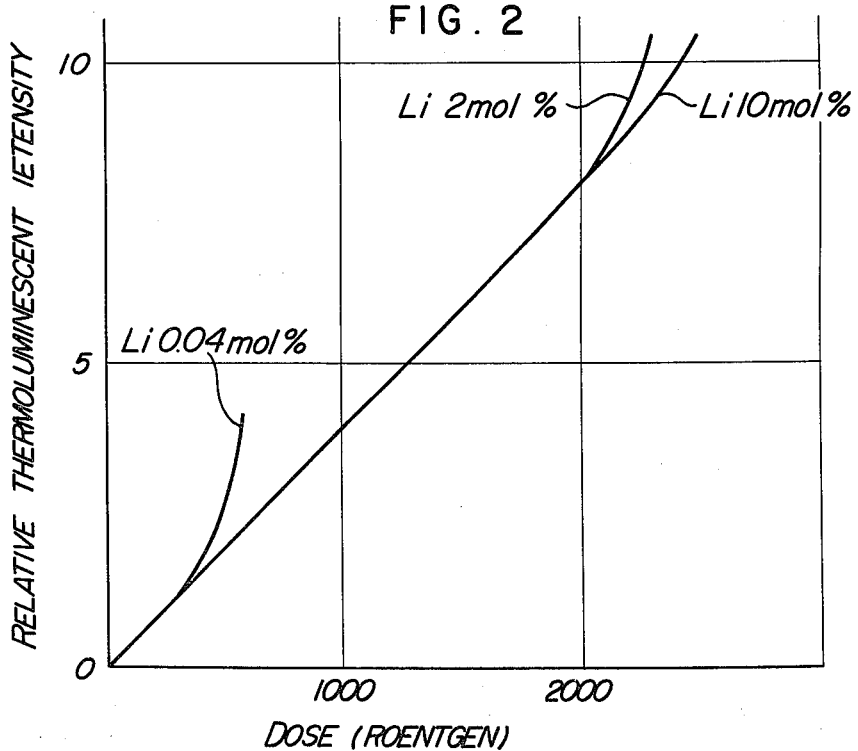

PHOSPHOR FOR THERMOLUMINESCENT RADIATION DOSIMETER

This is a division of application Ser. No. 138,118, filed Apr. 28, 1971.

This invention relates to a phosphor for a thermoluminescent radiation dosimeter which comprises beryllium oxide as a major portion and more than 0.5 % and up to 10 % by mole of at least one kind of activators selected from the group consisting of lithium, sodium and potassium.

An object of the present invention is to provide a material for a thermoluminescent radiation dosimeter having an improved radiation response characteristic.

The thermoluminescent radiation dosimeter has many advantages, as compared with other dosimeters, and various materials have been so far proposed for the dosimeter element, principal part of the dosimeter. Among others, the material based on beryllium oxide has an effective atomic number (7.2) almost equal to that of the tissue (7.4) and ensures an exact measurement of a dose absorbed by the tissue. This is an advantage of the material based on the beryllium oxide.

In U.S. Patent application, Ser. No. 709,739, the present inventors proposed a beryllium oxide material which comprises beryllium oxide as a major portion and 0.005 – 0.5 % by mole of an activator selected from lithium, sodium, potassium, etc.

Said material had a good sensitivity, a good retention of radiation energy absorbed, and a practically applicable characteristic. However, with the progress in studies on the commercialization of the material, it has been found that said material can have a good characteristic in a relatively small range of doses, for example, a few to several tens milliroentogens, but has a poor linearity regarding the radiation response in a medium or large range of doses, for example, more than 100 roentogens. Especially, in the radiation therapy, a radiation of several hundred roentogen is often employed. However, such use results in poor precision and thus an improvement has been so far desirable.

In view of the disadvantages of the prior art as mentioned above, the present invention is to provide a phosphor having a good linearity regarding the radiation response in the medium or large range of doses.

An impure element as an activator can be added to beryllium oxide as a matrix in the following manner. Powders of high purity beryllium oxide and a small amount of activator are mixed together as raw materials so that the activator can be uniformly distributed in the powders of beryllium oxide, and the resulting mixture is fired or sintered at a high temperature. Lithium, sodium or potassium is effective as the activator. At the mixing, a sulfate, carbonate or hydroxide of lithium, sodium or patassium is effective. Further, such beryllium salts as a sulfate, $BeSO_4\cdot 4H_2O$, etc. can be used as the beryllium oxide raw material, besides the oxide, $BeO$. The firing or sintering is carried out at 1,500° to 2,100°C.

These procedures are not basically different from those disclosed in said U.S. Patent application Ser. No. 709,739, now U.S. Pat. No. 3,637,518. However, the present invention is essentially different therefrom in the following points:

Heretofore, the material itself has been placed in a firing or sintering zone, for example, a sintering furnace, and fired or sintered at a high temperature, but the activator is evaporated owing to the high firing or sintering temperature and only a very small portion of the activator, for example, about one-tenth of the originally added amount of the activator, can be retained in the beryllium oxide. On the other hand, in the present invention, the material is placed in a container such as a crucible, etc. and after a lid is fixed to the container, the covered container containing the material is fired or sintered at the high temperature. In this manner, a considerable amount, for example, about one-half to one-fourth of the orginally added amount of the activator, can be retained in the beryllium oxide, whereby the beryllium oxide containing the activator at a high concentration can be obtained. When such a large amount of the activator is used, it is necessary to prolong the firing time. The optimum firing or sintering time is 3 to 24 hours. In the conventional prior art process it is difficult to obtain the material containing more than 0.5 % by mole of the activator of alkali metal, whereas in the present invention the material containing up to about 10 % by mole of the activator can be obtained.

Now, the present invention will be explained in detail, referring to examples as well as the accompanying drawings:

FIG. 1 is a diagram showing a relation between the dose and the relative thermoluminescent intensity when the sodium content of the beryllium oxide material is changed.

FIG. 2 is a diagram showing a relation between the dose and the relative thermoluminescent intensity when the lithium content is changed.

EXAMPLE 1

| | |
|---|---|
| High purity beryllium oxide powders: | 0.1 mole |
| Sodium sulfate: | 0.01 mole |

A small amount of water was added to said two raw materials, and the raw materials were sufficiently kneaded. The resulting mixture was dried at 180°C and placed in an aluminum boat. After a lid of aluminum plate was fixed to the boat, the boat was fired in air at 1,700°C for 8 hours. As a result of analysis of the thus fired beryllium oxide, it was found that 5 % by mole of Na was contained in Be. The thus prepared material showed that its relative thermoluminescent intensity to the radiation dose had an exact linearity upto about 1,000 roentogens.

In FIG. 1, the linearity of the relative thermoluminescent intensity to the radiation dose is shown for the beryllium oxide materials having different concentrations of the activator, which were prepared according to the same procedures as above. When only a small amount of Na was contained in the material, the linearity could be obtained only upto 100 roentogens. The linearity could be improved with the increased sodium content.

When potassium was used as the activator and the material was prepared according to the same procedure as in the case of the sodium activator, quite similar result could be obtained in the performance as in the case of the sodium activator shown above.

EXAMPLE 2

| | |
|---|---|
| High purity beryllium oxide powders: | 0.1 mole |
| Lithium sulfate: | 0.01 mole |

The material was prepared according to the same procedures as in Example 1. In the case of lithium activator, its behavior was somewhat different from the sodium or potassium activator. That is, the amount of lithium retained in the material after the firing was small. That is, even when 10 % by mole of lithium was mixed with the beryllium oxide powders as shown above, the actual lithium content of the resulting fired material as 2 %. Further, its linearity was somewhat different from those of the sodium or potassium activator. That is, the material containing the lithium activator had a linearity up to a higher radiation dose than the material containing the sodium activator. In the present Example, it had a linearity up to about 1,600 roentogens.

In FIG. 2, linearity of the relative thermoluminescent intensity to the radiation dose is shown for the materials having different lithium concentrations prepared according to the same procedures as shown above. As is seen from FIG. 2, the linearity can be obtained up to about 300 roentogens for the material having a small lithium content, but the linearity can be established up to about 2,000 roentogens with the increased lithium content.

In the foregoing, explanation has been made only to the case where only one kind of the impurity element, that is, the activator, is contained in beryllium oxide, but the similar effect can be obtained also when two or more kinds of the activators are added to the beryllium oxide as shown in the following Example 3.

EXAMPLE 3

| | |
|---|---|
| High purity beryllium oxide powders: | 0.1 mole |
| Sodium sulfate powders: | 0.005 mole |
| Lithium sulfate powders: | 0.005 mole |

The above powders were well mixed and in accordance with the procedure of Example 1, BeO ceramic was produced. Thus obtained product exhibited the characteristic lied between that of the product in Example 1 and that of the product in Example 2 and had a linearity up to about 1,200 roentogens.

As described above, the present material for a thermoluminescent radiation dosimeter contains at least one of the activators of lithium, sodium and potassium at a high concentration in the beryllium oxide material and thus can exactly measure the radiation dose up to such a higher level as 1,000 to 2,000 roentogens. In such a medical field as radiation therapy, etc. it is necessary to exactly measure the radiation dose in a range of several 100 to several 1,000 roentogens, but the present material can especially serve such an application.

What is claimed is:

1. A method for detecting and measuring radiation comprising exposing a thermoluminescent radiation dosimeter consisting of a major amount of beryllium oxide and a small amount of at least one activator selected from the group consisting of lithium, sodium and potassium to radiation; heating the dosimeter so that thermoluminescent radiation is given off; and measuring the intensity of the thermoluminescent radiation to determine the amount of radiation to which the dosimeter has been exposed, said dosimeter being capable of measuring high radiation dosages greater than 1000 roentogens.

2. A method according to claim 1, wherein more than 0.5% and up to 10% by mole of the activator per mole of beryllium oxide is contained.

* * * * *